Oct. 18, 1955 F. KREUZER 2,721,232

SIGNAL-TRANSMISSION CIRCUIT

Filed Oct. 25, 1952 2 Sheets-Sheet 1

Inventor.
Friedrich Kreuzer
By [signature] Atty.

Oct. 18, 1955

F. KREUZER 2,721,232

SIGNAL-TRANSMISSION CIRCUIT

Filed Oct. 25, 1952

2 Sheets-Sheet 2

Inventor:
Friedrich Kreuzer.
By. [signature] Atty.

United States Patent Office 2,721,232

Patented Oct. 18, 1955

2,721,232

SIGNAL-TRANSMISSION CIRCUIT

Friedrich Kreuzer, Munich, Germany, assignor to Siemens & Halske Aktiengesellschaft, Munich, Germany, a corporation of Germany Application October 25, 1952, Serial No. 316,907

Claims priority, application Germany November 16, 1951

6 Claims. (Cl. 178—70)

This invention is concerned wtih a differential signal-transmission circuit, particularly for use with relay repeaters in teleprinter telegraph systems, for transmitting from teleprinter subscribers' stations over associated subscribers' single-pole lines outgoing signals to double-pole signal transmission lines or channels and, vice versa, incoming signals from such lines or channels to the subscribers' teleprinters.

Modern telegraph systems, in which messages are usually transmitted over a plurality of serially related channels which are connected over relay repeaters, place high requirements on the repeater circuits so as to secure faithful transmission of the messages. It is, for example, demanded of such circuits that they transmit the signals from a teleprinter over a subscriber's line, which may be of great length, without falsifying the signal starts, so as to feed to the transmission channels signals which are practically free of distortion. The current curve of the signals should be of a form which is favorable for the operation of the teleprinter receiver and, within large limits, independent of the length of the subscribers' lines, even in the presence of signal-correcting, e. g., flattening, elements that may be inserted therein, so as to secure a large range for the operation of the receiver. The peculiarities of single-pole signal transmission, especially over relatively long subscribers' lines with considerable capacitance, and the required conversion of such signals to double-pole signals for the transmission over the associated telegraph channels, and vice versa, the conversion of double-pole signals from the channels to single-pole signals to be transmitted over such subscribers' lines, pose problems which are difficult to solve. In addition, the consequences of line discharges must be guarded against if the current over the single-pole subscriber's line is, incident to signal transmission, suddenly disconnected by interruption or by short circuit.

None of the previously known pertinent circuits meets the above noted requirements in a satisfactory manner in spite of the fact that some of them exhibit a considerable expenditure in switching equipment.

The present invention provides a satisfactory solution for the problems posed by the above noted operating requirements, also considering the inevitable line discharge, and does so with most simple line arrangement and least expenditure in switching means.

Figures 1, 2, 3:
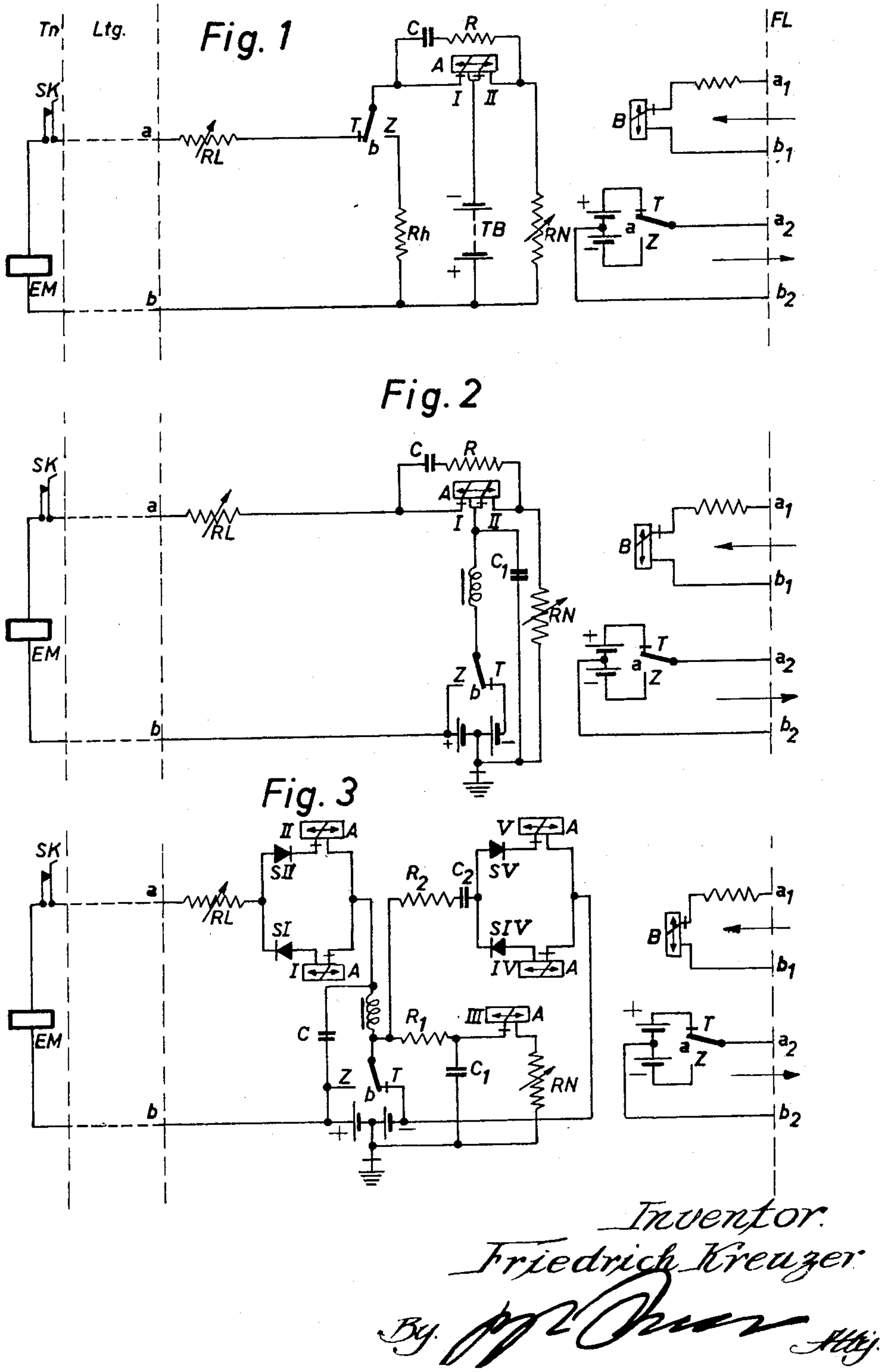
Figures 4, 5, 6:
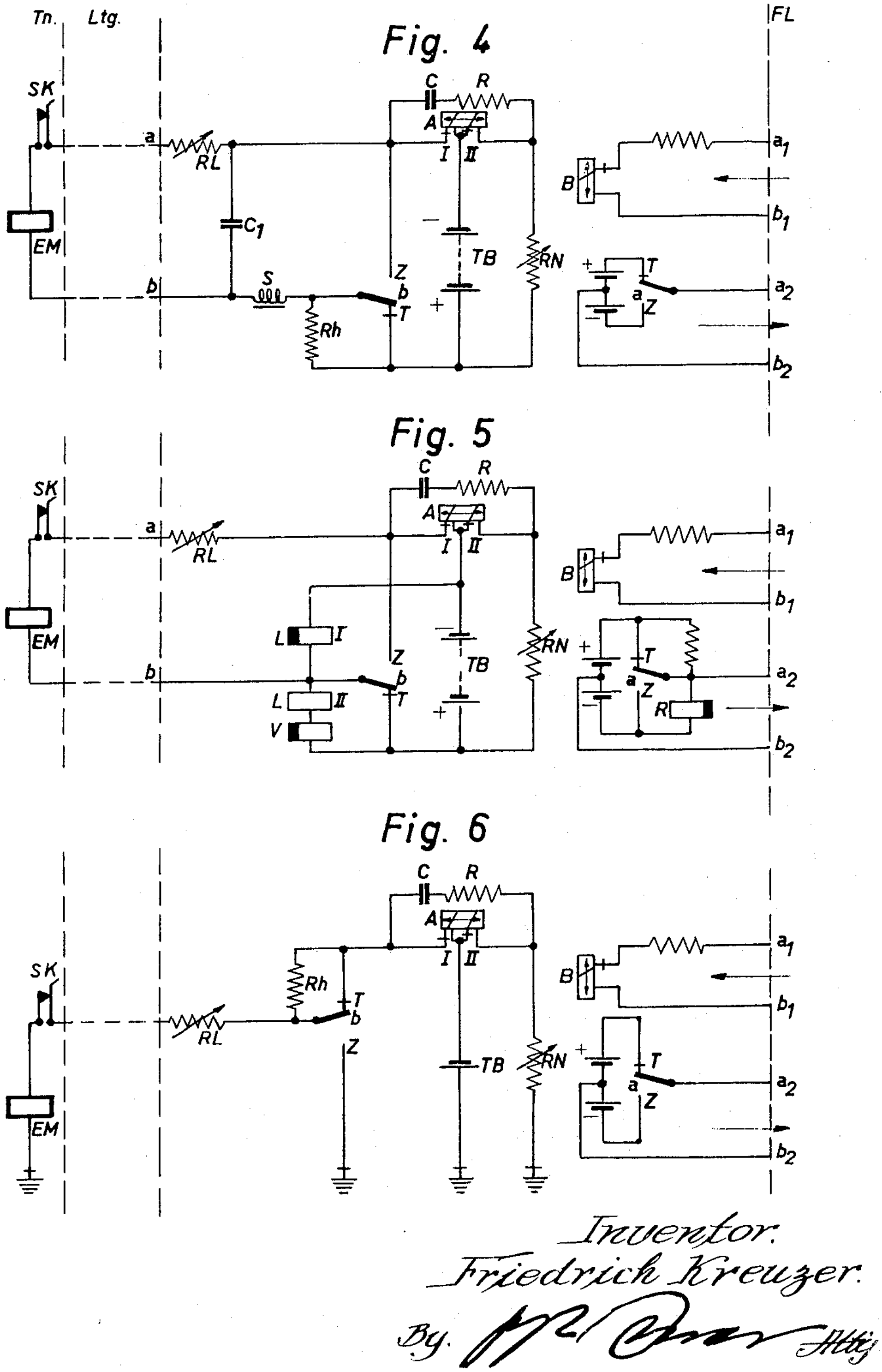

Details of the invention will appear from the description which will presently be rendered with reference to the accompanying diagrammatic drawings, in which Figs. 1–3 show examples of embodiments of known circuits;

Fig. 4 illustrates an example of a circuit according to the invention;

Fig. 5 indicates another example of the invention employing certain switching relays; and Fig. 6 is an example of the invention applied to a single-conductor subscriber's line, with ground return.

The known circuits, Figs. 1–3, have been included herein in order to clearly show the special features of the invention by comparison therewith. The operation of these circuits is assumed to be generally known; their peculiarities and disadvantages will be briefly discussed.

The operation of the systems shown in Figs. 1–3 is based on a differential circuit including the line relay A at the exchange, and they therefore exhibit generally identical basic features. The line relay A responds to signals produced at the subscribers' station T*n* by the transmitter contact SK of the teleprinter machine, resulting in current interruptions of the subscriber's line L*tg*, to transmit corresponding signals to the double-pole toll line or telegraph channel FL. A relay B is provided for re-transmitting incoming signals from the telegraph circuit FL to the teleprinter receiver magnet EM of the subscriber T*n*.

Fig. 1 shows the so-called interruption circuit common in Germany, in which the current over the subscriber's line L*tg* is interrupted incident to signal transmission from the channel FL to the subscribers T*n*. In the resting position of the circuit as shown in the drawing, conductor *a* of line L*tg* extends over supplemental line resistor RL, contact or armature *b* of relay B in its space position T and over line winding I of relay A to the negative pole of battery TB, and conductor *b* extends to the positive pole of the battery. The subscriber's line therefore carries a charge in accordance with its capacitance. If relay B is operated responsive to the double-pole signals coming over conductors $a_1$ and $b_1$ of transmisssion line FL, it will actuate its armature or contact *b* in step with these incoming signals. The line circuit of subscriber's line L*tg* will be interrupted incident to each switching over of armature *b* from its space position T to its marker position Z. Armature or contact *a* of line relay A remains, during such operation, in its space position T because armature *b* closes in its marker position Z a substitute circuit for the line circuit extending over line winding I of relay A in series with resistor R*h*. The current conditions over this substitute circuit are, so far as line winding I of relay A is concerned, equivalent to the current conditions prevailing in the space position T of armature *b*. The line relay A therefore is not affected by the incoming signals produced by the operation of relay B. The line discharge caused by the interruption of the line can be equalized exclusively in one direction, namely, over the subscriber's line, from the positively charged *b*-conductor over the receiver magnet EM and closed transmitter contact SK of the teleprinter to the *a*-conductor. The resulting signals therefore fade with some delay, and in the case of long subscribers' lines, may cause considerable distortions in the teleprinter receiver. The circuit as compared with other circuits of this kind therefore cannot bridge relatively great distances between the subscriber T*n* and the exchange. The use of current-correcting means in the line is for the same reasons possible only with certain limitations.

Fig. 2 shows the so-called American shunt circuit. As distinguished from the interrupter operation of Fig. 1, the current flow over the line L*tg* is in this circuit interrupted by short-circuiting the line at armature *b* in the marker position Z thereof incident to the transmission of incoming signals to the subscriber T*n*. In resting position the line conductor *a* extends over the supplemental line resistor RL, line winding I of relay A and armature *b* in its space position T to the negative pole of the battery, and the line conductor *b* extends to the positive pole. The line is thus electrically charged. Incoming signals transmitted over conductors $a_1$ and $b_1$ of the transmission channel FL are again received by relay B which responds thereto and actuates its armature *b* to transmit such signals to the subscriber T*n*. The line circuit is short-circuited whenever armature *b* is actuated from its space position T to its marker position Z. Line winding I of relay A is in such instances deenergized, but current flow is maintained over winding II from the positive pole of the battery over armature *b* in marker position Z, and relay A therefore remains with its armature *a* in space position.

The capacitative line discharge caused by the short-circuiting of the line is, as distinguished from the circuit Fig. 1, effected in Fig. 2 in the direction from the subscriber to the exchange as well as in opposite direction. The discharge in the direction to the exchange is effected from the *a*-conductor over winding I of relay A and armature *b* in its marker position Z to the positive pole of the battery, the discharge flowing over winding I being thereby in a direction corresponding to the current direction of the marker signals. The discharge amplitude may in the case of relatively long lines become great enough to overcome the current flow in winding II of relay A, causing actuation of such relay and therefore transmission of false signals and consequently distortion of messages.

Fig. 3 illustrates a relatively recently introduced modified shunt circuit employing rectifiers for avoiding the consequences of the line discharge. The expenditure of additional switching means is considerable as compared with Fig. 2, and the circuit lacks clarity with respect to structure and disposition of lines. Line relay A is provided with five windings I—V. Line windings I and II are identical as to number of turns and resistance. Winding III is the energizing winding for causing actuation of relay A, to place its armature *a* in marker position Z. Windings IV and V are auxiliary and supporting windings. The line current, which energizes the relay A to space position, flows over winding II and rectifier $S_{II}$. Current flowing over winding I is blocked by rectifier $S_I$. The line is in its illustrated condition electrically charged. Line discharge takes place in both directions responsive to actuation of armature *b* of relay B into its marker position Z, i. e., responsive to short-circuiting of the line. The discharge current flow in one direction, which is opposite to the direction of the line current, takes place from the positive pole of the battery, armature *b* in its marker position Z, over winding I of relay A and over rectifier $S_I$. Winding I of relay A is polarized so that the discharge current acts to maintain the relay in its space position. The danger of false energization of relay A is thus avoided.

However, the circuit according to Fig. 3 exhibits certain shortcomings which appear incident to transmission of signals from the subscriber to the exchange. The energization of line relay A in its space position should fade as rapidly as possible when the line current is interrupted by actuation of transmitter contact SK of the subscriber's teleprinter, so that such line relay can immediately switch over to its marker position by energization of its winding III. However, the self-induction potentials, which are produced in windings I and II, can become equalized over rectifiers $S_I$ and $S_{II}$ and can cause delayed fading of the energization of the relay in its space position. The fading interval must be kept within certain limits so as to avoid distortions. It is accordingly necessary to provide for a corresponding time constant for the windings. This means that the magnitude of the resistances of the windings must be provided in accordance with inductance of the type of relay used, resulting in a noticeable loss with respect to the length of line that can be served.

The invention proposes a circuit which completely avoids the above indicated disadvantages of known teleprinter signal-transmission circuits by causing the relay B to shunt the subscriber's line in the marker position Z of its armature *b*, thereby by-passing line winding I of line relay A, and also producing a holding circuit for such line winding I over line resistance R*h* which is shunted by armature *b* in its space position T. The resulting circuit provides a satisfactory and clearcut solution for the problems involved. The new circuit is distinguished by a simple and lucid structure, and keeps the expenditure in switching means at a minimum.

Fig. 4 shows an example of the invention indicating the circuit in its normal or resting condition. The single-pole subscriber's line circuit extends from the positive pole of the battery, armature *b* of relay B in its space position T, coil S of a current-correcting, e. g., flattening, chain, line conductor *b*, receiver EM, transmitter contact SK, line conductor *a*, line resistance RL and line winding I of relay A to the negative pole of battery TB. Line winding I is by the line current energized to hold armature *a* in space position T, as shown. Marker winding II of line relay A is connected as in Fig. 1, in a circuit which extends independent of armature *b* from the two poles of battery TB over an adjustable resistor RN. The current flowing in winding II energizes such winding in the marker direction. The current flowing in winding I is, however, preponderant, and armature *a* is therefore held in its space position T. Armature *a* controls the re-transmission of the signals over conductors $a_2$ and $b_2$ of the associated transmission line. Relay B receives incoming signals transmitted over conductors $a_1$ and $b_1$ of line FL.

If signals are now transmitted from the subscriber's station T*n*, the line circuit L*tg* will be in impulse manner interrupted by the actuation of the transmitter contact SK of the teleprinter. Marker winding II of line relay A will become operatively effective to place armature *a* into marker position Z incident to every interruption of the line current. The retransmission of the signals by relay A, with faithful spacing thereof, is in known manner dependent on the current passing through its two windings and also on the time constants of the circuit. The time interval of the operating stroke of armature *a* is, incident to energization of line winding I, due to the relatively great inductance of receiver magnet EM, greater than the time interval of the operating stroke thereof in opposite direction incident to energization of marker winding II. The current flow relationship through windings I and II is at constant flow through winding I so adjusted by adjustable resistor RN that the signals are re-transmitted practically free of distortion. The faithful spacing of the signals is, as in the circuit shown in Figs. 1 and 2, supported by the known capacitor resistor combination C and R in parallel with the windings of relay A. This combination forms with the inductance of relay A an oscillating circuit which imparts to the current flowing through its windings the symmetrical oscillations required for its operation. The distortion of the signals, which may be over relatively great distances transmitted from the subscriber's station to the exchange, is thereby kept at a minimum, even with current correction means inserted in the line, so that the signals are re-transmitted substantially free of distortion.

Incoming signals from the transmission lines $a_1$ and $b_1$ are received by relay B and are re-transmitted to the subscriber's line by its armature *b*. Whenever the armature *b* of relay B is placed in its marker position Z, it will shunt the subscriber's line and thus interrupt the current flow over such line. Armature *b* also establishes in its marker position a holding circuit for winding I of line relay A from the positive pole of battery TB over holding resistor R*h*. The holding current flow in this circuit corresponds, with respect to direction and magnitude, to that of the line current, so that relay A is maintained with its armature *a* in its space position T. This space position of relay A and its armature *a* is also maintained during the switching over operations of the armature *b* of relay B, first, because the line current through winding I of relay A is not interrupted but is maintained at a reduced value over resistor R*h*; and, second, because discharge current also flows through winding I of relay A in identical direction from the parallel oscillation circuit including capacitor C and, resistor R.

The line discharge caused by the shunting of the line by armature *b* in its marker position Z does not involve the windings of line relay A, and detrimental effects with respect to this relay are therefore avoided. Current-correcting, e. g., flattening, means can therefore be introduced into the line without any detriment. This is of great importance for keeping within permissible bounds inductive effects of the telegraph signals on neighboring telephone lines. The line discharges, especially in relatively long lines in which RL will be near zero, are equalized predominantly in the direction of the exchange, and only to a minor degree in the direction of the subscriber's station; and the current impulses in the receiver magnet EM of the teleprinter will therefore exhibit a rapidly fading characteristic, thus providing for a wide receiver range which is within large limits independent of the length of the line.

The novel disposition of armature *b* of relay B permits in simple manner the control of one or more switching relays, as is indicated in Fig. 5. Two slow-to-release relays L and V may be provided, as shown in Fig. 5. The relay L has two windings I and II and the relay V has one winding. The operation of these relays is controlled by the armature *b* of relay B. The winding II of relay L jointly with the winding of the relay V thus take the place of the resistor R*h* shown in Fig. 4. The winding I of the relay L is a high-resistance winding. These relays may be used for controlling desired switching functions. Relay L will be energized over its winding I in the space position T, of armature or contact *b*, but such winding will be nearly shunted in the marker position Z of armature *b*. Only a relatively weak residual energization will remain, winding $L_I$ being then in parallel with winding I of relay A, which will receive holding current over $L_{II}$ and V in the same manner as it received holding current over resistor R*h* in Fig. 4. Relay L is thus made slow to release and will remain operated during the actuation of armature *b* for controlling desired switching functions. The response characteristic of relay L may of course be modified so as to cause operation thereof in step with the actuation of armature *b* for controlling desired switching functions.

Assuming slow-to-release operation of the relay L as noted above, the relay will not restore during the short marker impulses when the contact or armature *b* of relay B is in its marker position Z. Accordingly, relay L will restore only upon cessation of the telegraph signal transmission, i. e., upon conclusion of the connection, when the armature *b* assumes the marker position Z for a prolonged interval. The relay L may thus be used as a supervisory relay for governing the disconnect signal.

The relay V shown in Fig. 5 is likewise controlled by the armature or contact *b* and may be similarly utilized for the supervision of the connection. Being slow to release, relay V will remain operated for the duration of the actuation of armature *b*, to perform desired functions serving the connection or the transmission of signals. As in the case of relay L, the response characteristic of relay V may be such as to cause it to operate in step with armature *b*.

The relays L and V thus constitute supervisory relay means and function as control relays.

The invention may be used, as shown in Fig. 6, e. g., for effecting the signal transmission over a single-conductor subscriber's line with ground return. Relay armature *b* is in such a case simply connected with the line conductor, and the marker contact side Z thereof is connected to ground. Practice has proved that the transmission quality of such a circuit is as good as that of a two-conductor line. The operating steps are analogous to those described in connection with the previous embodiments.

I claim:

1. In a signal-transmission circuit having a line terminating in a line relay for receiving signals outgoing from said line and for transmitting such outgoing signals over an associated channel and having a repeater relay for receiving signals incoming from said channel and for transmitting such incoming signals to said line, said line relay having a line winding normally disposed in circuit with said line, said repeater relay having an armature, a resistance, circuit means controlled by said armature in normal position thereof for short-circuiting said resistance, and circuit means controlled by said armature in alternate operating position thereof for short-circuiting said line at a point ahead of said line winding and for completing a holding circuit for such line winding which includes said resistance.

2. The signal-transmission circuit as set forth in claim 1, comprising a current source, said line extending normally between said armature and a contact associated therewith with is engaged thereby in alternate operating position thereof, said resistance extending normally between said armature and a contact which is engaged thereby in normal position thereof, and said line winding of said line relay being normally connected in a circuit including said current source and two contacts associated with said armature and respectively engaged thereby in its alternate operating positions.

3. The signal-transmission circuit as set forth in claim 1, wherein said line relay comprises a second winding in addition to said line winding, a resistance associated with said second winding, and circuit means for maintaining said second winding normally energized over said associated resistance.

4. The signal-transmission circuit as set forth in claim 1, comprising supervisory relay means forming said resistance, said supervisory relay means being controlled by said armature.

5. The signal-transmission circuit as set forth in claim 4, wherein said supervisory relay means comprises a relay having a winding forming said resistance.

6. The signal-transmission circuit as set forth in claim 5, comprising a current source, circuit means for connecting said line winding with said current source, said supervisory relay means comprising a pair of control relays each having a winding, and circuit means for connecting the windings of said control relays with said current source and with said armature, respectively.

References Cited in the file of this patent

FOREIGN PATENTS

| | | |
|---|---|---|
| 523,039 | Germany | Apr. 18, 1931 |
| 529,975 | Germany | July 20, 1931 |